United States Patent
Weed et al.

(10) Patent No.: US 9,599,716 B2
(45) Date of Patent: Mar. 21, 2017

(54) GROUND-BASED SYSTEM AND METHOD TO EXTEND THE DETECTION OF EXCESSIVE DELAY GRADIENTS USING DUAL PROCESSING

(71) Applicant: Honeywell International Inc., Morristown, NJ (US)

(72) Inventors: Douglas Weed, Forest Lake, MN (US); Randy J. Reuter, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 431 days.

(21) Appl. No.: 14/253,431

(22) Filed: Apr. 15, 2014

(65) Prior Publication Data

US 2015/0293230 A1 Oct. 15, 2015

(51) Int. Cl.
*G01S 19/04* (2010.01)
*G01S 19/08* (2010.01)
*G01S 19/20* (2010.01)

(52) U.S. Cl.
CPC .............. *G01S 19/04* (2013.01); *G01S 19/08* (2013.01); *G01S 19/20* (2013.01)

(58) Field of Classification Search
CPC ........... G01S 19/04; G01S 19/08; G01S 19/20
(Continued)

(56) References Cited

U.S. PATENT DOCUMENTS

| 5,041,833 A | 8/1991 | Weinberg |
| 5,477,458 A | 12/1995 | Loomis |

(Continued)

FOREIGN PATENT DOCUMENTS

| KR | 101074641 | 10/2011 |
| WO | 2008141320 | 11/2008 |
| WO | 2009103745 | 8/2009 |

OTHER PUBLICATIONS

European Patent Office, "Communication Under Rule 71(3) from EP Application No. 15153385.8 mailed Jan. 27, 2016", "from Foreign Counterpart of U.S. Appl. No. 14/253,431", Jan. 27, 2016, pp. 142, Published in: EP.

(Continued)

*Primary Examiner* — Harry Liu
(74) *Attorney, Agent, or Firm* — Fogg & Powers LLC

(57) ABSTRACT

A processing module to monitor a horizontal delay gradient in satellite signals is provided. The processing module includes a dual-processing-satellite-differencing module, a double differencing module, and a gradient estimator module. The dual-processing-satellite-differencing module is operable to: receive carrier phase measurements for at least two satellites from at least two reference receivers; implement a first processing mode to normalize first satellite differences between $+\lambda/2$ and $-\lambda/2$; implement a second processing mode configured to normalize second satellite differences between 0 and $\lambda$; and select for further processing one of: data indicative of the first satellite differences processed according to the first processing mode; and data indicative of the second satellite differences processed according to the second processing mode. The double differencing module forms double-differences based on the selected data input from the dual-processing-satellite-differencing module. The gradient estimator module estimates a magnitude of the horizontal delay gradient.

20 Claims, 6 Drawing Sheets

(58) Field of Classification Search
USPC .................................................. 342/357.41
See application file for complete search history.

(56) References Cited

U.S. PATENT DOCUMENTS

| | | | |
|---|---|---|---|
| 5,786,773 | A | 7/1998 | Murphy |
| 6,603,426 | B1 | 8/2003 | Clark |
| 6,674,398 | B2 | 1/2004 | Murphy |
| 6,859,690 | B2 | 2/2005 | Asher et al. |
| 7,089,452 | B2 | 8/2006 | Rubin et al. |
| 7,095,369 | B1 | 8/2006 | Clark |
| 7,310,062 | B1 | 12/2007 | Hwang |
| 7,388,539 | B2 | 6/2008 | Whitehead et al. |
| 7,477,183 | B2 | 1/2009 | Watson et al. |
| 7,548,196 | B2 | 6/2009 | Fagan et al. |
| 8,094,064 | B2 | 1/2012 | Brenner |
| 2005/0146461 | A1 | 7/2005 | Pande et al. |
| 2006/0047413 | A1 | 3/2006 | Lopez et al. |
| 2006/0273953 | A1 | 12/2006 | Watson et al. |
| 2009/0262013 | A1 | 10/2009 | Vollath |
| 2010/0324822 | A1* | 12/2010 | Coatantiec .............. G01S 19/47 701/472 |
| 2011/0215965 | A1* | 9/2011 | Brenner .................. G01S 19/08 342/357.24 |
| 2014/0035778 | A1 | 2/2014 | Berlin de la Hautiere et al. |
| 2015/0293231 | A1 | 10/2015 | Weed et al. |

OTHER PUBLICATIONS

European Patent Office, "Extended European Search Report from EP Application No. 15153385.8 mailed Jul. 7, 2015", "from Foreign Counterpart of U.S. Appl. No. 14/253,431", Jul. 7, 2015, pp. 15, Published in: EP.

European Patent Office, "Extended European Search Report from EP Application No. 14192170.0 mailed Jul. 3, 2015", "from Foreign Counterpart of U.S. Appl. No. 14/253,431", Jul. 3, 2015, pp. 1-7, Published in: EP.

Arthur, "The Disparity of Parity, Determining Position Confidence Bounds in the Presence of Biases", "Ion GNSS 18th International Technical Meeting of the Satellite Division", Sep. 13-16, 2005, pp. 1841-1853, Published in: Long Beach, CA.

Gratton et al., "Experimental Observations and Integrity Monitor Applications of LAAS IMLA Carrier Phase Measurements", Sep. 21-24, 2004, Publisher: Ion GNSS 17th International Technical Meeting of the Satellite Division, Published in: Long Beach, CA.

Kline, "An Experimental Investigation of Relativistic Effects in GPS", "Navigation: Journal of the Institute of Navigation", Winter 1998-1999, pp. 297-305, vol. 45, No. 4.

Lee et al., "Enhancements of Long Term Ionospheric Anomaly Monitoring for the Ground-Based Augmentation System", "Proceedings of the 2011 International Technical Meeting of the Institute of Navigation", Jan. 26, 2011, pp. 930-941.

Pervan et al., "Parity Space Methods for Autonomous Fault Detection and Exclusion using GPS Carrier Phase","1996 Position Location and Navigation Symposium", Apr. 22-26, 1996, pp. 649-656, Published in: Atlanta, GA.

Reuter et al., "Ionosphere Gradient Detection for Cat III GBAS", "25th International Technical Meeting of the Satellite Division of the Institute of Navigation", Sep. 17-21, 2012, pp. 2175-2183, Published in: Nashville, TN.

Sturza, "Navigation System Integrity Monitoring Using Redundant Measurements", "Navigation: Journal of the Institute of Navigation", Winter 1988-89, pp. 483-501, vol. 35, No. 4.

Weed et al., "Ground-Based System and Method to Extend the Detection of Excessive Delay Gradients Using Parity Corrections", "U.S. Appl. No. 14/253,445, filed Apr. 15, 2014", Apr. 15, 2014.

* cited by examiner

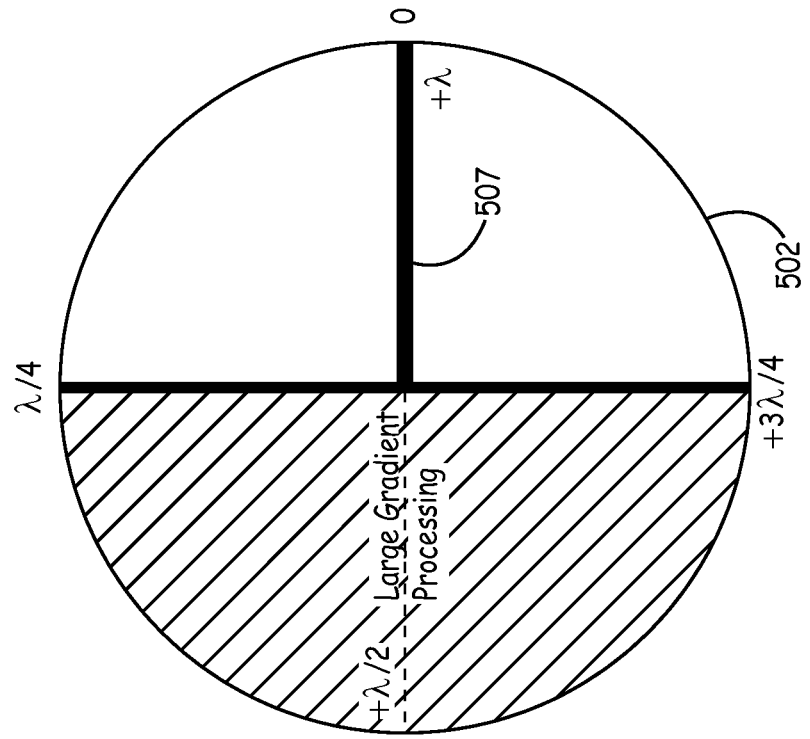
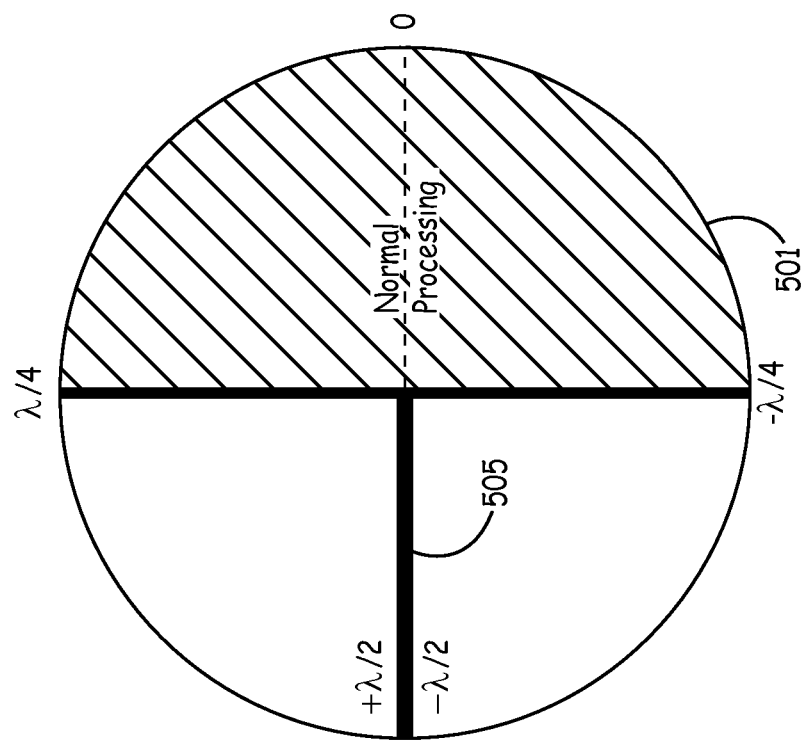

GROUND-BASED SYSTEM AND METHOD TO EXTEND THE DETECTION OF EXCESSIVE DELAY GRADIENTS USING DUAL PROCESSING

GOVERNMENT LICENSE RIGHTS

This invention was made with Government support under Government Contract # DTFACT-10-C-00013 awarded by FAA WM J Hughes Technical Center. The Government has certain rights in the invention.

BACKGROUND

The electron density of the ionosphere varies as a function of geographic location and time. The International Civil Aviation Organization (ICAO) is developing standards to address the threat to navigation and guidance systems in aircraft stemming from an ionosphere anomaly, i.e., extreme changes in electron density of the ionosphere. The standard development has shown it is critical that ground monitoring for delay gradients in satellite signals due to an ionosphere anomaly is absolute and not relative to previous satellite measurements. It is important to detect an extreme gradient from the very first set of measurements taken from a satellite as it moves into view of a ground-based GPS augmentation system.

The GBAS (Ground Based Augmentation System) Approach Service Type D (GAST D) standard shares the mitigation of ionosphere gradient errors between the ground and airborne subsystems. This leads to the need for an ionosphere gradient monitor (IGM) located in the ground subsystem in order to ensure the integrity of the system is not compromised in the presence of an ionosphere gradient. If an ionosphere gradient is present, then there will be a measureable phase difference between a reference receiver pair for a particular satellite after the satellite has been differenced with the average of all the other satellites in order to remove common mode errors. Due to non-common satellite errors, this differencing with the average of all the other satellites limits the IGM to carrier phase differences to no greater than $\pm\lambda/2$. Thus, to avoid carrier phase differences greater than $\pm\lambda/2$, the baseline separation of reference receivers is limited based on the wavelength of the satellite signal and largest ionosphere gradient required to be detected.

SUMMARY

The present application relates to a processing module to monitor a horizontal delay gradient in satellite signals. The processing module includes a dual-processing-satellite-differencing module, a double differencing module, and a gradient estimator module. The dual-processing-satellite-differencing module is operable to: receive carrier phase measurements for at least two satellites from at least two reference receivers, the at least two satellites including a monitored satellite and at least one other satellite, wherein the at least two reference receivers have a known geometric relationship to each other; implement a first processing mode to normalize first satellite differences between $+\lambda/2$ and $-\lambda/2$; implement a second processing mode configured to normalize second satellite differences between 0 and $\lambda$; and select for further processing one of: data indicative of the first satellite differences processed according to the first processing mode; and data indicative of the second satellite differences processed according to the second processing mode. The double differencing module is configured to form double-differences between one or more pairs of the at least two reference receivers based on the selected data input from the dual-processing-satellite-differencing module. The gradient estimator module is configured to estimate a magnitude of the horizontal delay gradient based on averaged compensated double-differences for the monitored satellite.

DRAWINGS

FIG. 5A shows a wavelength circle diagram with a discontinuity between $-\lambda/2$ and $+\lambda/2$ for a normal fault free processing mode;

FIG. 5B shows a wavelength circle diagram with a discontinuity between 0 and $+\lambda$ for a large gradient processing mode;

In accordance with common practice, the various described features are not drawn to scale but are drawn to emphasize features relevant to the present invention. Like reference characters denote like elements throughout figures and text.

DETAILED DESCRIPTION

Figure 1:
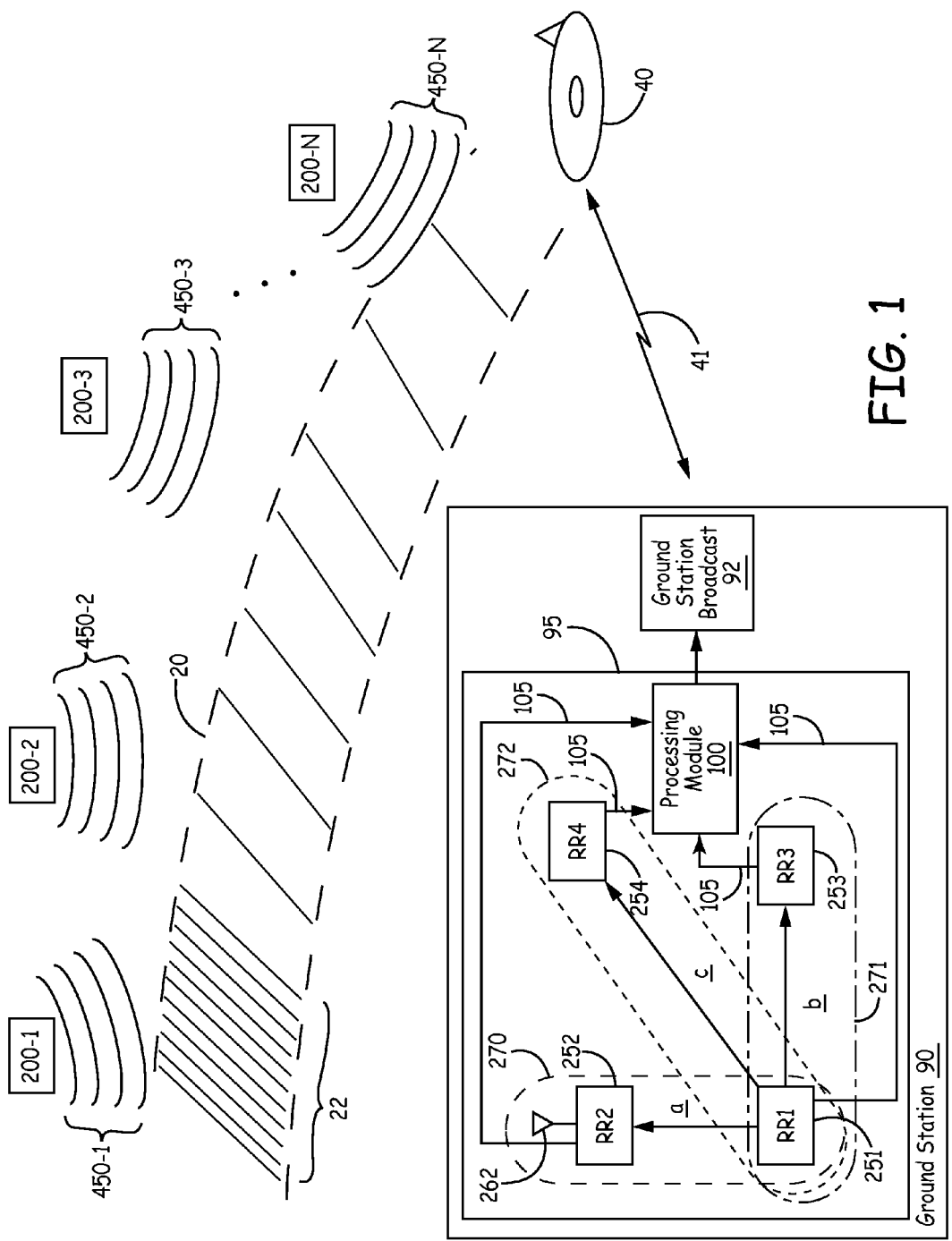
FIG. 1 shows an embodiment of a ground station to monitor for excessive delay gradients in satellite signals.

The excessive delay gradient monitor is one of the most demanding monitors in a ground station. The excessive delay gradient monitor requires the carrier accuracy be held to millimeter levels. The horizontal delay gradient monitor described herein detects the horizontal component of a delay gradient affecting signals received at the ground station by comparing carrier phase measurements for at least two reference receivers located in a horizontal plane. The horizontal component of the delay gradient lies within the plane in which these reference receivers are located. The horizontal delay gradient monitor also determines if the delay gradient is excessive. A delay gradient is excessive when the delay difference at a pair of reference receivers on a signal transmitted from a monitored satellite is greater (by more than a selected gradient threshold) than the averaged delay difference on the signals transmitted from other satellites and simultaneously received at the same pair of reference receivers.

A minimum of two reference receivers are needed to measure a gradient in one direction. This configuration with only two reference receivers is useful for ground station installations that only require detection of delay gradients along a line. For example, the horizontal gradient monitor could include two reference receivers positioned along a line that is parallel to the direction of a landing strip. Such a horizontal gradient monitor is a "line-gradient monitor." A minimum of three non-collinear reference receivers are needed in a horizontal gradient monitor to measure a gradient along any line within the horizontal plane of the three non-collinear reference receivers.

If four or more reference receivers are available, redundant information is used to improve sensitivity to horizontal delay gradients. The terms "anomalous delay gradient," "delay gradient," "ionospheric delay gradient," and "horizontal delay gradient" are used interchangeably herein.

The techniques described herein extend the detection capability of an ionospheric delay gradient monitor by implementing a dual processing of the satellite differences, which are used to detect and avoid measurements at a discontinuity (i.e., at either 0 or at $\lambda/2$). The first processing of the dual-processing-satellite-differencing module described herein normalizes carrier phase differences between satellites to between $+\lambda/2$ and $-\lambda/2$ and generates a first variance. The second processing of the dual-processing-satellite-differencing module described herein normalizes carrier phase differences between satellites to between 0 and $\lambda$ and generates a second variance. Selection logic determines which processing result to use for downstream processing based on the values of the first and second variances. The output from the first processing is selected for additional downstream processing when the first variance is less than the second variance. Likewise, the output from the second processing is selected for additional downstream processing when the second variance is less than the first variance. Other parameters can be used in the selection process if both variances are relatively small. This dual processing guarantees that at least one of the two processing methods avoids the wavelength limitation for any given set of satellite differences at any given time. In this manner, the baseline between pairs of reference receivers can be increased allowing for more flexible siting options at GBAS airports.

FIG. 1 shows an embodiment of a ground station 90 to monitor for excessive delay gradients in satellite signals over a full wavelength range. As shown in FIG. 1, the ground station 90 includes a horizontal delay gradient monitor 95 and a ground station broadcast 92. The ground station broadcast 92 is that portion of the ground station 90 that transmits signals via communication link 41 to aircraft 40 in the vicinity of the ground station 90. The horizontal delay gradient monitor 95 monitors for an excessive delay gradient present in the horizontal plane for signals 450-1 transmitted from a monitored satellite 200-1. The ground station 90 is also referred to herein as a "ground based system 90".

The horizontal delay gradient monitor 95 includes at least two reference receivers positioned in a known geometric relationship to each other and a processing module 100, which includes a plurality of functional modules executable by a processor. The embodiment shown in FIG. 1 includes four reference receivers 251-254. The horizontal delay gradient has a horizontal component that lies in the plane that encompasses the four reference receivers 251-254. The processing module 100 is communicatively coupled to each of the reference receivers 251-254. During operation, the horizontal delay gradient monitor 95 receives signals from at least two satellites 200(1-N). The reference receivers 251-254 are ground reference receivers also indicated herein as "RR's."

The radio frequency signals 450(1-N) shown generally as phase fronts are emitted from the satellites 200(1-N), respectively (where N is a positive integer). The terms radio frequency signals, RF signals, and satellite signals are used interchangeably herein. The radio frequency signals 450(1-N) propagate through the ionosphere generally represented by 20 to the ground station 90. The four reference receivers 251-254 receive radio frequency signals 450(1-N) from the monitored satellite 200-1 and from the other satellites 200 (2-N). As is understood, each reference receiver 251-254 is a radio frequency receiver with an antenna, such as antenna 262 on reference receiver 252. Only one antenna 262 (seen on the second reference receiver 252) is shown for clarity of illustration.

There can be anomalous delay gradients 22 in the ionosphere 20 that affect the phase of the radio frequency signals that propagate through the anomalous delay gradient 22. The anomalous delay gradient 22 is indicated by an increased density of cross-hatching in the ionosphere 20. For example, as shown in FIG. 1, the radio frequency signal 450-1 from the monitored satellite 200-1 passes through the anomalous delay gradient 22 as it propagates toward the four reference receivers 251-254. The delay gradient 22 results in a horizontal gradient as the signals are received on the surface of the earth. This means that the ionospheric delay of the received signal changes as a receiver is moved on the surface of the earth.

The radio frequency signals 450(1-N) transmitted from the respective satellites 200(1-N) are sampled at approximately the same time at the reference receivers 251-254. A register (not shown) in the reference receivers 251-254 stores a number indicative of the instant carrier phase angle of the received $n^{th}$ satellite radio frequency signal 450-$n$, where n is a positive integer. The register is continuously updated for the radio frequency signals received from the $n^{th}$ satellite 200-$n$ in each of the reference receivers 251-254. The $n^{th}$ satellite radio frequency signal 450-$n$ is from one of the at least two satellites. An instant read out of the register is referred herein to as the "carrier phase measurement," or "instantaneous carrier phase measurement." The carrier tracking loops (not shown) in the reference receivers 251-254 estimate the resulting phase and Doppler errors and update such a register for each of the N satellites 200(1-N) in view of the reference receivers 251-254. The down conversion for each reference receiver is common to all the N satellites 200(1-N), thus the instantaneous carrier phase indicated by the register can be used to determine the relative phase between received satellite signals within the range of 0° to 360°. The relative phase is the phase relationship between signals transmitted from the at least two satellites and simultaneously received at the reference receivers 251-254. The relative phase is thus the difference in the carrier phase measurement between the signals transmitted from the at least two satellites that are simultaneously received at the reference receivers 251-254.

The known geometric relationship between the at least two reference receivers 251-254 is indicated by: vector a from the first reference receiver 251 to the second reference receiver 252; vector b from the first reference receiver 251 to the third reference receiver 253; and vector c from the first reference receiver 251 to the fourth reference receiver 254. Thus, the reference receivers in the reference receiver pairs 270-272 have a known difference-in-position versus the reference receiver 251 that is common to all the pairs 270-272. For example, vector a is the known difference-in-position of the reference receivers 251 and 252 that form the pair 270, vector b is the known difference-in-position of the reference receivers 251 and 253 that form the pair 271, and vector c is the known difference-in-position of the reference receivers 251 and 254 that form the pair 272.

The monitored satellite is that satellite for which a magnitude of the horizontal ionospheric delay gradient is monitored against a selected gradient threshold. The first satellite 200-1 is being referred to as the monitored satellite 200-1 in this document, but it is to be understood that the ground station 90 can monitor ionospheric delay gradient to two or more of the N satellites 200(1-N). Thus, the software modules in the processing module 100 are executable to monitor two or more of the N satellites 200(1-N) so that two or more of the satellites 200(1-N) are monitored satellites. In embodiments, all the satellites 200(1-N) are monitored satellites 200(1-N).

The dual processing described herein relaxes the requirement for the length of the vectors a, b, and c to be limited to avoid carrier phase ambiguities, which are caused by a cyclical repeat of the same phase relation. In one embodiment, the ground station 90 is a GBAS ground station 90. Although the ground station 90 described herein is for an airport landing system, this invention can be implemented in systems that require accurate input from a global navigation satellite system and is not limited for use with aircraft and/or ground stations for aircraft.

Figure 2:
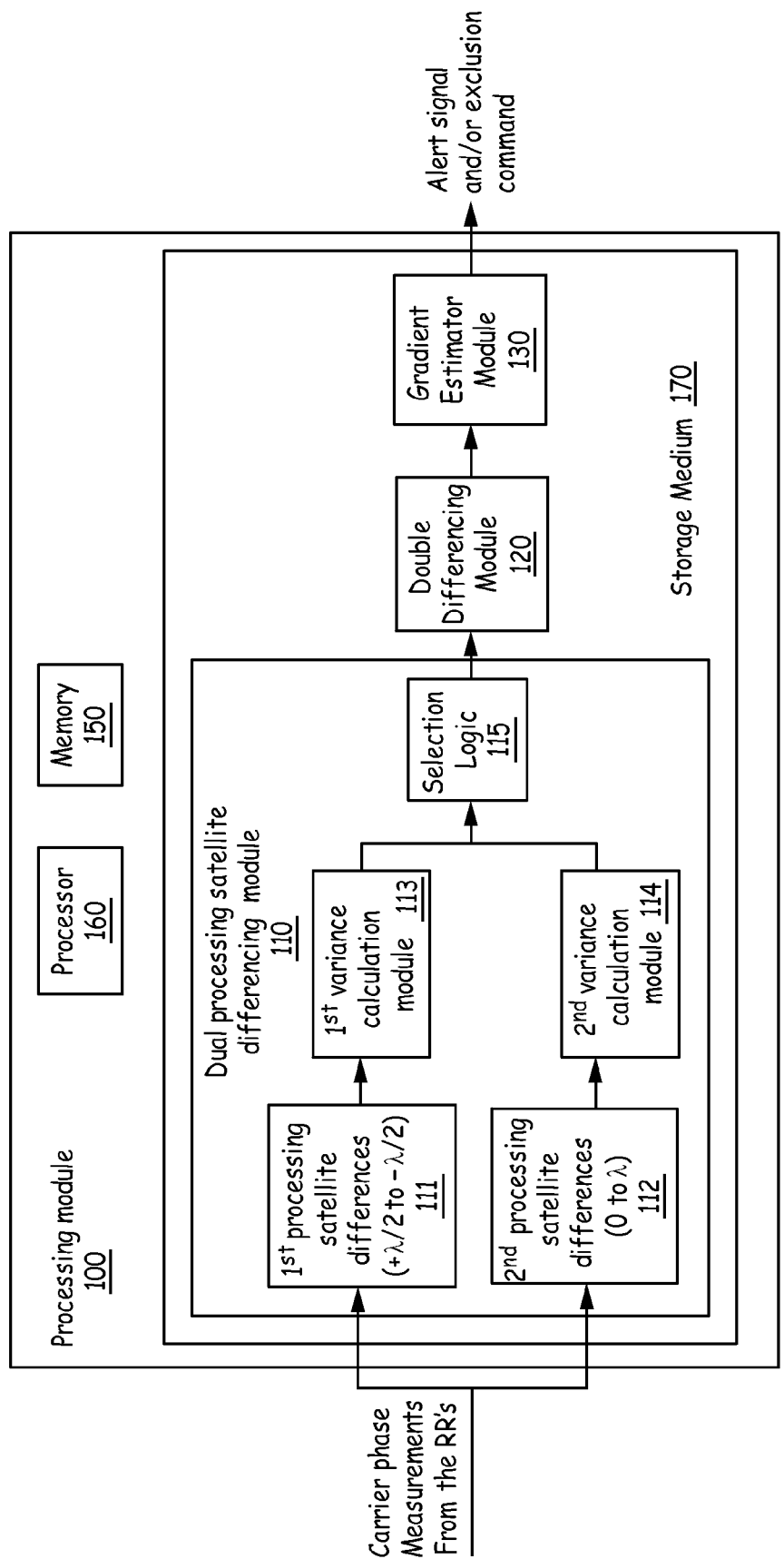
FIG. 2 shows an embodiment of a processing module in the ground station of FIG. 1.

FIG. 2 shows an embodiment of a processing module 100 in the ground station 90 of FIG. 1. The processing module 100 includes a dual-processing-satellite-differencing module 110, a double differencing module 120, a gradient estimator module 130, a memory 150, and at least one processor 160. The dual-processing-satellite-differencing module 110, the double differencing module 120, and the gradient estimator module 130 are software modules stored in a storage medium 170. The dual-processing-satellite-differencing module 110, the double differencing module 120, and the gradient estimator module 130 include computer readable medium encoded with computer instructions for performing the functions described herein. In one implementation of this embodiment, one or more of the dual-processing-satellite-differencing module 110, the double differencing module 120, and the gradient estimator module 130 are the same module.

The dual-processing-satellite-differencing module 110 includes a first-processing-satellite-differences module 111, a first variance calculation module 113, a second-processing-satellite-differences module 112, a second variance calculation module 114, and selection logic 115. In one implementation of this embodiment, carrier phase measurements from the reference receivers 251-254 are input to the first-processing-satellite-differences module 111 and the second-processing-satellite-differences module 112. In another implementation of this embodiment, the satellite differences in the carrier phase measurements between satellite signals from the monitored satellite and at least one of the at least one other satellite 251-254 are input to the first-processing-satellite-differences module 111 and the second-processing-satellite-differences module 112. In this latter case, the carrier phase measurements from the reference receivers 251-254 are input to the dual-processing-satellite-differencing module 110 and software in the dual-processing-satellite-differencing module 110 is used to calculate the satellite differences in the carrier phase measurements between satellite signals from the monitored satellite and at least one of the at least one other satellite 200(2-N). The calculated satellite differences are then input to the first-processing-satellite-differences module 111 and the second-processing-satellite-differences module 112.

The first processing is done by the first-processing-satellite-differences module 111 for first discontinuity between $+\lambda/2$ and $-\lambda/2$ limitation. The second processing is done by the second-processing-satellite-differences module 112 for a second discontinuity between 0 and $\lambda$. The first and second processing are done by the first-processing-satellite-differences module 111 and the second-processing-satellite-differences module 112 at the same time and on the same input data.

The first-processing-satellite-differences module 111 outputs differences normalized between $+\lambda/2$ and $-\lambda/2$ to the first variance calculation module 113, which determines a first variance for the differences normalized between $+\lambda/2$ and $-\lambda/2$. The second-processing-satellite-differences module 112 outputs differences normalized between 0 and $\lambda$ to the second variance calculation module 114, which determines a second variance for the differences normalized between 0 and $\lambda$.

Outputs from the first variance calculation module 113 and the second variance calculation module 114 are input to the selection logic 115. The selection logic 115 determines which of the first processing and second processing generated the smallest variance. If the first variance from the output of the first variance calculation module 113 is smaller than the second variance from the output of the second variance calculation module 114, the dual-processing-satellite-differencing module 110 is configured to output data associated with the differences normalized between $+\lambda/2$ and $-\lambda/2$ to the double differencing module 120. If the second variance output from the second variance calculation module 114 is smaller than the first variance from the output of the first variance calculation module 113, the dual-processing-satellite-differencing module 110 is configured to output data associated with the differences normalized between 0 and $\lambda$ to the double differencing module 120.

The double differencing module 120 is communicatively coupled to input the data from the dual-processing-satellite-differencing module 110 and provide input to the gradient estimator module 130. The processor 160 is communicatively coupled to execute software in the dual-processing-satellite-differencing module 110, the double differencing module 120, and the gradient estimator module 130. The memory 150 is communicatively coupled to interface the dual-processing-satellite-differencing module 110, the double differencing module 120, and the gradient estimator module 130 to each other as required to perform the functions described herein.

Memory 150 comprises any suitable memory now known or later developed such as, for example, random access memory (RAM), non-volatile memory, read only memory (ROM), and/or registers within the processor 160. The storage medium 170 comprises any storage device now known or later developed such as, for example, random access memory (RAM), non-volatile storage, read only memory (ROM). In one implementation, processor 160 comprises microprocessors or microcontrollers. Moreover, although the processor 160 and the memory 150 are shown as separate elements in FIG. 1, in one implementation, the processor 160 and memory 150 are implemented in a single device (for example, a single integrated-circuit device). In one implementation, the processor 160 comprises processor support chips and/or system support chips such as application-specific integrated circuits (ASICs).

The implementation of the processing module 100 is now described in detail, with reference to FIGS. 2-6. The method 300 is described for four reference receivers 251-254 using a subset of satellites 200(2-K) (K is an integer less than or equal to N) for comparison with the monitored satellite 200-1. The satellites 200(1-N) are in view of the reference receivers 251-254. As defined herein, a satellite is in view of a reference receiver if the radio frequency signals transmitted from the satellite are received by an antenna with sufficient power to be tracked in the reference receiver.

Figure 3:
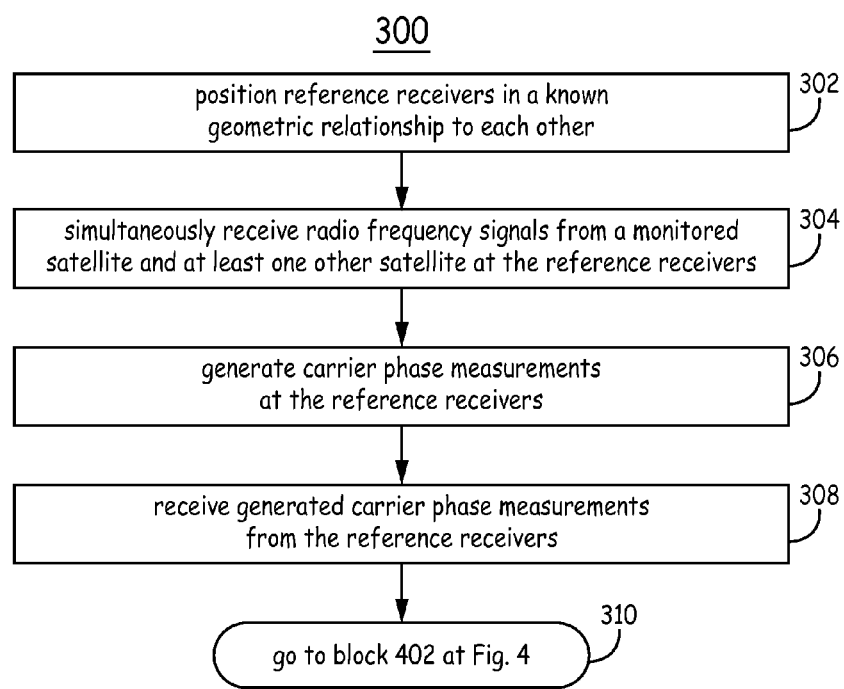
FIG. 3 shows a flowchart representative of one embodiment of a method to receive carrier phase measurements from reference receivers at a dual-processing-satellite-differencing module in the processing module of FIG. 2.

FIG. 3 shows a flowchart representative of one embodiment of a method 300 to receive carrier phase measurements from reference receivers at a dual-processing-satellite-differencing module 110 in the processing module 100 of FIG. 2. The method 300 is described with reference to the ground station 90 to monitor for ionospheric delay gradients such as shown in FIG. 1 although it is to be understood that method 300 can be implemented using other embodiments of the system as is understandable by one skilled in the art who reads this document.

At block 302, at least two reference receivers 251-254 are positioned in a known geometric relationship to each other. In one implementation of this embodiment, four reference receivers 251-254 are positioned in a known geometric relationship to each other. In another implementation of this embodiment, the four reference receivers 251-254 are positioned in proximity to the processing module 100. At block 304, radio frequency signals 450-1 and 450-2 are simultaneously received from the monitored satellite 200-1 and at least one other satellite 200-2 at the least two reference receivers 251-254. In one implementation of this embodiment, radio frequency signals 450(1-K) are simultaneously received from the respective monitored satellite 200-1 and the K−1 other satellites 200(2-K) at the four reference receivers 251-254 where K is an integer that is less than or equal to N. The reference receivers are able to determine which signal came from which satellite by a pseudorandom code specific to each satellite or by other data received from the satellite that is used to identify the satellite.

At block 306, the reference receivers 251-254 generate carrier phase measurements for the radio frequency signals 450-1 received from the monitored satellite 200-1 and for the radio frequency signals simultaneously received from another satellite 200-2. If there are four reference receivers 251-254 and K−1 other satellites 200(2-K) are being used in addition to the monitored satellite 200-1, then the reference receivers 251-254 generate carrier phase measurements for the radio frequency signal 450-1 received from the monitored satellite 200-1 and for radio frequency signals 450(2-K) simultaneously received from the K−1 other satellites 200(2-K). In one embodiment, all of the other satellites 200(2-N) are used to monitor the monitored satellite 200-1. The reference receivers 251-254 send information indicative of the generated carrier phase measurements to the processing module 100 via wireless or wired links 105 (FIG. 1).

At block 308, the dual-processing-satellite-differencing module 110 of the processing module 100 receives the generated carrier phase measurements from at least two reference receivers 251-254. In one implementation of this embodiment, the first-processing-satellite-differences module 111 and the second-processing-satellite-differences module 112 in the dual-processing-satellite-differencing module 110 of the processing module 100 each receive the generated carrier phase measurements from at least two reference receivers 251-254 and the satellite differences are computed at both the first-processing-satellite-differences module 111 and the second-processing-satellite-differences module 112. In another implementation of this embodiment, software in the dual-processing-satellite-differencing module 110 receives the generated carrier phase measurements from at least two reference receivers 251-254, determines the satellite differences, and then provides the differences to the first-processing-satellite-differences module 111 and the second-processing-satellite-differences module 112. In this embodiment, the processes at blocks 404 and 406 described below with reference to FIG. 4 are not implemented.

At block 310, the flow of method 300 then proceeds to block 402 of method 400 described below with reference to FIG. 4.

Figure 4:
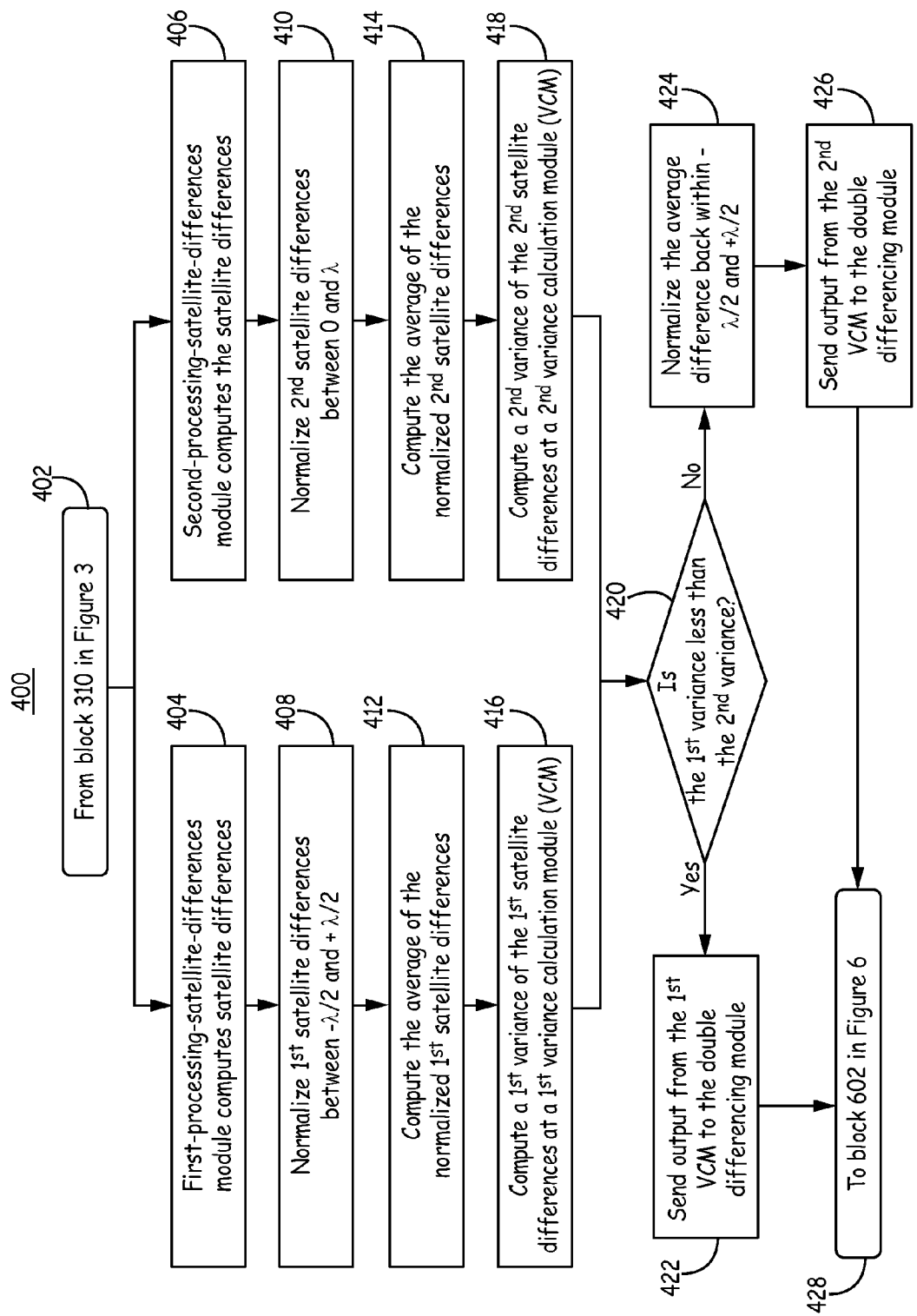
FIG. 4 shows a flowchart representative of one embodiment of a method to dually process carrier phase measurements at a first-processing-satellite-differences module and a second-processing-satellite-differences module.

FIG. 4 shows a flowchart representative of one embodiment of a method 400 to dually process carrier phase measurements at a first-processing-satellite-differences module 111 and a second-processing-satellite-differences module 112. The method 400 is described with reference to the ground station 90 to monitor for ionospheric delay gradients such as shown in FIG. 1 and with reference to the processing module 100 shown in FIG. 2 although it is to be understood that method 400 can be implemented using other embodiments of the system as is understandable by one skilled in the art who reads this document. The flow for method 400 occurs for each sample period for each reference receiver 251-254.

The processor 160 in the processing module 100 executes program product comprising processor-readable medium (on which program instructions are embodied) to cause the dual-processing-satellite-differencing module 110 to perform the functions described below with reference to blocks 404-426 of method 400. The process implemented in blocks 404, 408, 412, and 416 is a first processing, which is also referred to herein as "first processing mode" or "normal fault free processing mode". The process implemented in blocks 406,410, 414, and 418 is a second processing, which is also referred to herein as "second processing mode" or "large gradient processing mode".

At block 402, the flow proceeds from block 310 of method 300 of FIG. 3 to block 404 and block 406.

At block 404, the first-processing-satellite-differences module 111 computes satellite differences. The first-processing-satellite-differences module 111 in the dual-processing-satellite-differencing module 110 determines differences in the carrier phase measurements between the signals from the monitored satellite and at least one other satellite. The carrier phase measurements are input to the first-processing-satellite-differences module 111 from the at least two reference receivers 251-254. The first-processing-satellite-differences module 111 determines differences in the carrier phase measurements between the radio frequency signals 450-1 received from the monitored satellite 200-1 at the reference receivers 251-254 and the radio frequency signals 450(2-K) received from at least a subset 200(2-K) of the other satellites at the reference receivers 251-254.

At block 406, the second-processing-satellite-differences module 112 computes satellite differences. Blocks 404 and 406 occur at the same time or at nearly the same time. The carrier phase measurements are input to the second-processing-satellite-differences module 112 from the at least two reference receivers 251-254. The second-processing-satellite-differences module 112 in the processing satellite differencing module 110 determines differences in the carrier phase measurements between the signals from the monitored satellite and at least one other satellite. The second-processing-satellite-differences module 112 determines differences in the carrier phase measurements between the radio frequency signals 450-1 received from the monitored satellite 200-1 at the reference receivers 251-254 and the radio frequency signals 450(2-K) received from at least a subset 200(2-K) of the other satellites at the reference receivers 251-254.

For example, the first-processing-satellite-differences module 111 and the second-processing-satellite-differences module 112 each take the difference between the instantaneous carrier phase measurement for the first satellite 200-1 at the first reference receiver 251 and the instantaneous carrier phase measurement for the second satellite 200-2 at the first reference receiver 251. The first-processing-satellite-differences module 111 and the second-processing-satellite-differences module 112 each take the difference between the instantaneous carrier phase measurement for the first satellite 200-1 at the second reference receiver 252 and the instantaneous carrier phase measurement for the second satellite 200-2 at the second reference receiver 252. The first-processing-satellite-differences module 111 and the second-processing-satellite-differences module 112 each take the difference between the instantaneous carrier phase measurement for the first satellite 200-1 at the third reference receiver 253 and the instantaneous carrier phase measurement for the second satellite 200-2 at the third reference receiver 253.

If there are three satellites 200(2-3) in the subset of other satellites, then the first-processing-satellite-differences module 111 and the second-processing-satellite-differences module 112 each take the difference between the instantaneous carrier phase measurement for the first satellite 200-1 at the first reference receiver 251 and the instantaneous carrier phase measurement for the third satellite 200-3 at the first reference receiver 251. The first-processing-satellite-differences module 111 and the second-processing-satellite-differences module 112 each take the difference between the instantaneous carrier phase measurement for the first satellite 200-1 at the second reference receiver 252 and the instantaneous carrier phase measurement for the third satellite 200-3 at the second reference receiver 252. The first-processing-satellite-differences module 111 and the second-processing-satellite-differences module 112 each take the difference between the instantaneous carrier phase measurement for the first satellite 200-1 at the third reference receiver 253 and the instantaneous carrier phase measurement for the third satellite 200-3 at the third reference receiver 253.

In this manner, the first-processing-satellite-differences module 111 and the second-processing-satellite-differences module 112 each establish (K−1) differences (at the appropriate wavelength region) $\delta\phi^m_{n,k}$ for each reference receiver, where "m" is the positive integer for the $m^{th}$ reference receiver, "n" is the positive integer for the $n^{th}$ commonly evaluated satellite (monitored satellite), and "k" is the positive-integer for the $k^{th}$ other satellite.

As defined herein, the differences in the carrier phase measurements processed at a first-processing-satellite-differences module 111 in the dual-processing-satellite-differencing module 110 in accordance with the normal fault free processing mode are "first satellite differences". Likewise, as defined herein, the differences in the carrier phase measurements processed at a second-processing-satellite-differences module 112 in the dual-processing-satellite-differencing module 100 in accordance with the large gradient processing mode are "second satellite differences". In one implementation of this embodiment, the first-processing-satellite-differences module 111 and the second-processing-satellite-differences module 112 each separately execute software to determine the differences in the carrier phase measurements to determine respective first satellite differences and second satellite differences. In another implementation of this embodiment, the differences are generated within the dual-processing-satellite-differencing module 110 and the differences are then input into both the first-processing-satellite-differences module 111 and the second-processing-satellite-differences module 112 for further processing.

The differences (i.e., the first satellite differences and the second satellite differences) in the carrier phase measurements can be shown in a matrix format. When there are four satellites (including the monitored satellite) then the difference matrix for the first reference receiver 251 has the following form:

$$\begin{bmatrix} \delta\phi^1_{1,2} \\ \delta\phi^1_{1,3} \\ \delta\phi^1_{1,4} \end{bmatrix} \qquad (1)$$

The dual-processing-satellite-differencing module 110 likewise generates a difference matrix for the second reference receiver 252, which has the following form:

$$\begin{bmatrix} \delta\phi^2_{1,2} \\ \delta\phi^2_{1,3} \\ \delta\phi^2_{1,4} \end{bmatrix} \qquad (2)$$

The dual-processing-satellite-differencing module 110 likewise generates a difference matrix for the third reference receiver 253, which has the following form:

$$\begin{bmatrix} \delta\phi^3_{1,2} \\ \delta\phi^3_{1,3} \\ \delta\phi^3_{1,4} \end{bmatrix} \qquad (3)$$

The dual-processing-satellite-differencing module 110 likewise generates a difference matrix for the fourth reference receiver 254, which has the following form:

$$\begin{bmatrix} \delta\phi^4_{1,2} \\ \delta\phi^4_{1,3} \\ \delta\phi^4_{1,4} \end{bmatrix} \qquad (4)$$

Thus, the dual-processing-satellite-differencing module 110 calculates (K−1) differences $\delta\phi$ for each reference receiver that provides input to the dual-processing-satellite-differencing module 110, where K is the number of satellites in the subset. These differences reflect the relative phase within in 0° to 360° between the radio frequency signals 450(1-K) transmitted from the first satellite 200-1 and the other satellites in the subset 200(2-K).

At block 408, the first-processing-satellite-differences module 111 normalizes (i.e., limits) the first satellite differences computed at block 404 between $+\lambda/2$ and $-\lambda/2$.

At block 410, the second-processing-satellite-differences module 112 normalizes (i.e., limits) the second satellite differences computed at block 406 between 0 and $\lambda$. Blocks 408 and 410 occur at the same time or at nearly the same time.

At block 412, the first-processing-satellite-differences module 111 computes the average of the normalized first satellite differences calculated at block 408. At block 414, the second-processing-satellite-differences module 112 computes the average of the normalized second satellite differences calculated at block 410. Blocks 412 and 414 occur at the same time or at nearly the same time.

The first-processing-satellite-differences module 111 outputs the normalized first satellite differences computed at block 408 and the average of the normalized first satellite differences calculated at block 412 to the first variance calculation module 113 in the dual-processing-satellite-differencing module 110. The second-processing-satellite-differences module 112 outputs the normalized second satellite differences computed at block 410 and the average of the normalized second satellite differences calculated at block 414 to the second variance calculation module 114 in the dual-processing-satellite-differencing module 110.

At block 416, the first variance calculation module (VCM) 113 computes the first variance of the first satellite differences. The first variance calculation module 113 outputs the first variance to the selection logic 115 in the dual-processing-satellite-differencing module 110.

At block 418, the second variance calculation module 114 computes the second variance of the second satellite differences. Blocks 416 and 418 occur at the same time or at nearly the same time. The second variance calculation module 114 outputs the variance to the selection logic 115 in the dual-processing-satellite-differencing module 110.

The selection logic 115 in the dual-processing-satellite-differencing module 110 inputs the variances from the first variance calculation module 113 and the second variance calculation module 114. At block 420, the selection logic 115 selects to output for further processing one of: selected differences processed in accordance with the first processing mode; or selected differences processed in accordance with the second processing mode. When the selection logic 115 selects to output for further processing the data (first data) computed according to the first processing mode, the data indicative of the first satellite differences processed according to the first processing mode is referred to as "selected data", "selected differences in the carrier phase measurements" or "selected first data". When the selection logic 115 selects to output for further processing the data (second data) from the second processing mode, the data indicative of the second satellite differences processed according to the second processing mode is referred to as "selected data", "selected differences in the carrier phase measurements" or "selected second data". The selection is based on the computed variance of the differences in the first processing mode and the second processing mode. In one implementation of this embodiment, the selection logic 115 determines if the variance computed by the first variance calculation module 113 for the differences normalized between $+\lambda/2$ and $-\lambda/2$ are less than the variance computed by the second variance calculation module 114 for the differences normalized between 0 and $\lambda$.

In one implementation of this embodiment, the selection logic 115 selects the normal fault free processing mode if the first variance generated by the first processing mode is less than a variance threshold and the mean value is between $(-\lambda/4$ and $+\lambda/4)$. In this latter case, when the variance generated for the normal fault free processing mode is greater than the variance threshold and the mean value is between $(-\lambda/4$ and $+\lambda/4)$, the selection logic 115 selects the large gradient processing mode with differences normalized between 0 and $\lambda$.

The advantage of this dual processing is now described with reference to FIGS. 5A and 5B. FIG. 5A shows a wavelength circle diagram 501 with a discontinuity 505 between $-\lambda/2$ and $+\lambda/2$ for a normal fault free processing mode. FIG. 5B shows a wavelength circle diagram 502 with a discontinuity 507 between 0 and $+\lambda$ for a large gradient processing mode.

The wavelength circle diagrams 501 and 502 provide a visual indication of how carrier phase differences near a discontinuity are associated with errors in the signals 450 (1-N) coming from the satellites 200(1-N). Ideally, the differences/errors are zero on the wavelength circle diagram 501. The differences/errors in the carrier phase are naturally in angular units (i.e., degrees), but are also converted to distance units by setting 360 degrees equal to one wavelength ($\lambda$) of the satellite carrier signal. For example, if the satellite carrier wavelength is 190 mm, an angular phase difference of 180 degrees is equal to a "half wavelength" or "95 mm".

Wavelength circle diagrams 501 represent the satellite carrier phase difference for each of the reference receivers 251-254 (FIG. 1) in each sample time period in the normal fault free processing mode. The normal fault free processing mode is also referred to herein as "nominal processing" or "nominal processing mode". For the normal fault free processing mode there is a discontinuity near $\pm\lambda/2$. If the signal goes from 0 in the negative direction (clockwise around the wavelength circle diagram 501) through $-\lambda/4$ to $-\lambda/2$ and passes through 180°, the satellite carrier phase difference experiences the discontinuity 505 and jumps from $-\lambda/2$ to $+\lambda/2$. Likewise, if the signal goes from 0 in the positive direction (counter-clockwise around the wavelength circle diagram 501) through $+\lambda/4$ to $+\lambda/2$ and passes through 180°, the satellite carrier phase difference experiences the discontinuity 505 and jumps from $+\lambda/2$ to $-\lambda/2$. When the satellite carrier phase difference passes through the discontinuity 505 of $+\lambda/2$ to $-\lambda/2$ in the wavelength circle diagram 501, there are inaccuracies in the output from the ionospheric gradient monitor for normal fault free processing mode. In this case, the average of the variance calculated at block 416 is large.

Wavelength circle diagrams 502 represent the satellite carrier phase difference for each of the reference receivers 251-254 in each sample time period in the large gradient processing mode. For large gradient processing mode there is a discontinuity near 0 and $\lambda$. If the signal goes from $+\lambda/2$ in the negative direction (clockwise around the wavelength circle diagram 502) through $+\lambda/4$ to 0 and passes through 0, the satellite carrier phase difference experiences the discontinuity 507 and jumps from 0 to $+\lambda$. Likewise, if the signal goes from $+\lambda/2$ in the positive direction (counter-clockwise around the wavelength circle diagram 502) through $+3\lambda/4$ to $+\lambda$ and passes through $+\lambda$ the satellite carrier phase difference experiences the discontinuity 507 and jumps from $+\lambda$ to 0. When the satellite carrier phase difference passes through the discontinuity 507 of $+\lambda$ to 0 in the wavelength circle diagram 502, there are inaccuracies in the output from the ionospheric gradient monitor for the large gradient processing mode. In this case, the average of the variance calculated at block 418 is large.

The dual-processing-satellite-differencing module 110 is configured to process the data from the reference receivers and reject (or eliminate) the processing mode that goes through a discontinuity. If the data for a given reference receiver 251-254 (FIG. 1) passes through the discontinuity 507 at $+\lambda$ to 0, the average of the variance calculated at block 418 is large. In this case, the output from the nominal processing mode (first process) is selected for further processing downstream.

If the data for a given reference receiver passes through the discontinuity 505 at $+\lambda/2$ to $-\lambda/2$, the average of the variance calculated at block 416 is large. In this case, the output from the large gradient processing mode (second process) is selected for further processing downstream.

Even if the data does not go through a discontinuity at 505 or 507, the dual-processing-satellite-differencing module 110 is configured to select output from the optimal processing mode for further downstream processing, based on a variance threshold.

If it is determined (at block 420) that the normal fault free processing mode, as represented in FIG. 5A, has the smallest variance, the flow of method 400 proceeds from block 420 to block 422. At block 422, the output (first data) indicative of the first satellite differences computed according to the first processing mode is sent from the first variance calculation module 113 to the double differencing module 120. In one implementation of this embodiment, the data indicative of the first satellite differences is sent to the double differencing module 120 via the selection logic 115. In another implementation of this embodiment, the selection logic 115 instructs the first variance calculation module 113 to send the data indicative of the first satellite differences directly to the double differencing module 120. In some embodiments of this latter case, the selection logic 115 instructs the second variance calculation module 114 to delete the data indicative of the second satellite differences for that sample time period. The flow of method 400 proceeds from block 422 to block 428. The data indicative of the first satellite differences is information indicative of the first satellite differences required for further processing to estimate the horizontal gradient. Likewise, the data indicative of the second satellite differences is information indicative of the second satellite differences required for further processing to estimate the horizontal gradient.

If it is determined (at block 420) that the large gradient processing mode, as represented in FIG. 5B, has the smallest variance, then the flow of method 400 proceeds from block 420 to block 424. At block 424, the dual-processing-satellite-differencing module 110 normalizes the average difference back within $+\lambda/2$ and $-\lambda/2$ by adding $+\lambda/2$ to the measurement for the sample time period. At block 426, output (second data) indicative of the second satellite differences computed according to the second processing mode is sent from the second variance calculation module 114 to the double differencing module 120. In one implementation of this embodiment, the second data indicative of the second satellite differences is sent to the double differencing module 120 via the selection logic 115. In another implementation of this embodiment, the selection logic 115 instructs the second variance calculation module 114 to send the data indicative of the second satellite differences directly to the double differencing module 120. In some embodiments of this latter case, the selection logic 115 instructs the first variance calculation module 113 to delete the data indicative of the first satellite differences for that sample measurement period. The flow of method 400 proceeds from block 426 to block 428.

Figure 6:
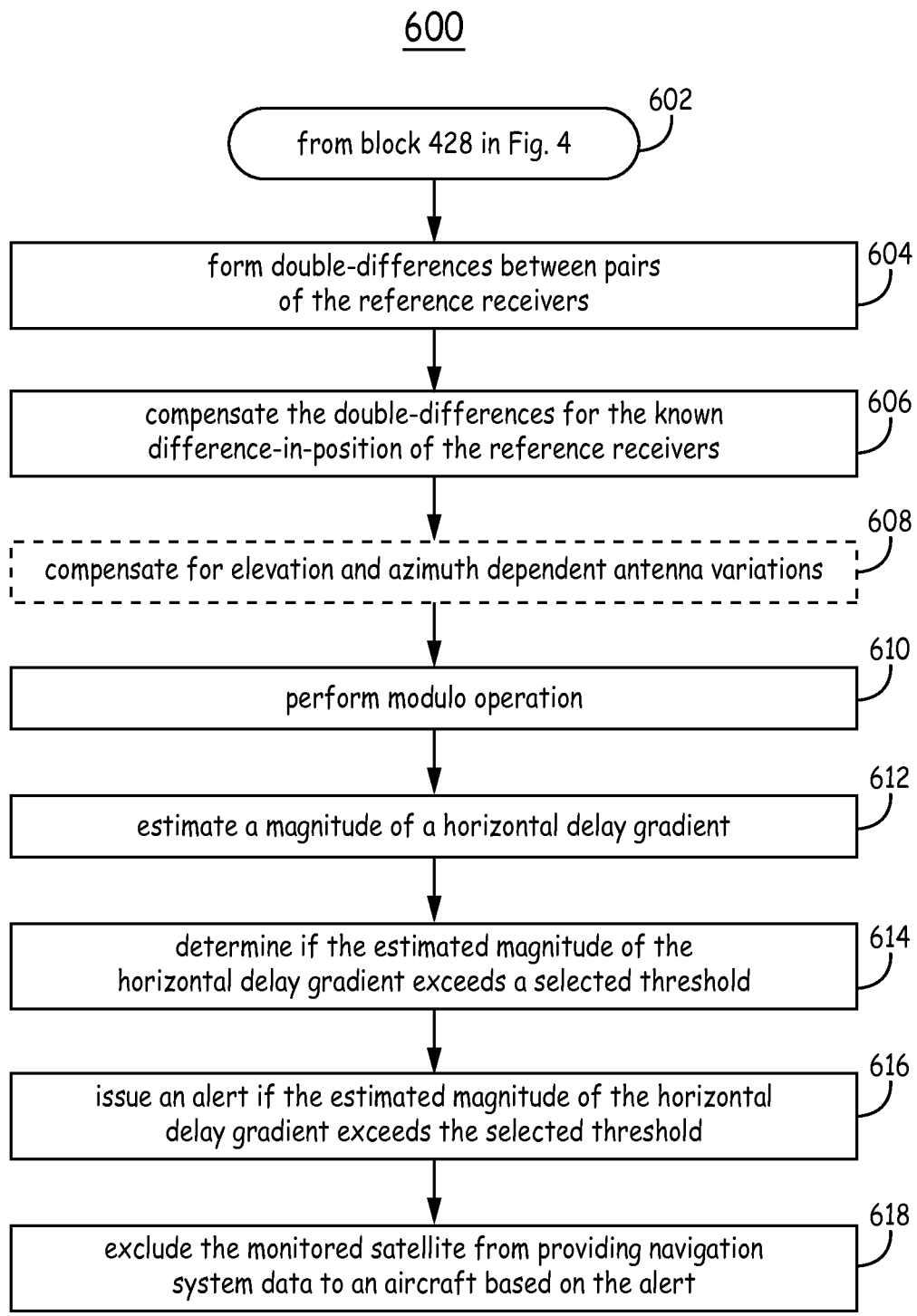
FIG. 6 shows a flowchart representative of one embodiment of a method to determine a magnitude of a horizontal delay gradient.

At block 428 the flow proceeds to block 602 in FIG. 6. FIG. 6 shows a flowchart representative of one embodiment of a method 600 to determine a magnitude of a horizontal delay gradient. The method 600 is described with reference to the ground station 90 to monitor for ionospheric delay gradients such as shown in FIG. 1 and with reference to the processing module 100 shown in FIG. 2 although it is to be understood that method 600 can be implemented using other embodiments of the system as is understandable by one skilled in the art who reads this document. This flow for method 600 occurs for each sample period for each reference receiver pair 251-254.

As described above with reference to FIG. 4, either the first variance calculation module 113 in the dual-processing-satellite-differencing module 110 or the second variance calculation module 114 in the dual-processing-satellite-differencing module 110 sends selected output (i.e., selected data) to the double differencing module 120 at blocks 422 or 426, respectively.

The double differencing module 120 is configured to input the selected data that was processed in accordance with a selected one of the first processing mode and the second processing mode. Specifically, the double differencing module 120 accepts the differences $\delta\phi^m_{n,k}$ from either the first variance calculation module 113 or the second variance calculation module 114.

The flow of method 600 proceeds from block 602 to block 604. At block 604, the double differencing module 120 forms double differences ($d_{n,k}$) between pairs of the reference receivers 270, 271, and 272. The double differences for the first pair 270 is the difference in $\delta\phi^m_{n,k}$ between first reference receiver 251 and second reference receiver 252, which is mathematically represented as $$d_{n,k}[RR1,RR2]=\delta\phi^2_{n,k}-\delta\phi^1_{n,k}. \qquad (5)$$

If there are four reference receivers the double differences between the first pair 270 are obtained by $d_{n,k}[RR1,RR2]=\delta\phi^2_{n,k}-\delta\phi^1_{n,k}$; the double differences between the second pair 271 are obtained by $d_{n,k}[RR1,RR3]=\delta\phi^3_{n,k}-\delta\phi^1_{n,k}$; and the double differences between the third pair 272 are obtained by $d_{n,k}[RR1,RR4]=\delta\phi^4_{n,k}-\delta\phi^1_{n,k}$.

At block 606, the double differencing module 120 compensates the double-differences for the known difference-in-position of the reference receivers in the pairs. This compensation is a geometric compensation process in which the difference-in-position is projected on the line of sight to the satellite. The known geometric relationship of the common reference receiver 251 (in the pairs 270-272) to the other reference receivers 252-254 and the unit vector defining the line of sight are used in this step of the process. As described above, the known geometric relationship is indicated by vector a from the first reference receiver 251 to the second reference receiver 252; vector b from the first reference receiver 251 to the third reference receiver 253; and vector c from the first reference receiver 251 to the fourth reference receiver 254.

At block 608, the double differencing module 120 compensates for elevation and azimuth dependent antenna variations for the antennas associated with the respective at least two reference receivers 251-254. In one implementation of this embodiment, the double differencing module 120 uses a function series (such as spherical harmonics) to compensate for elevation and azimuth dependent antenna variations for the antennas. In another implementation of this embodiment, the double differencing module 120 uses tabulated numbers and interpolation to compensate for elevation and azimuth dependent antenna variations for the antennas. Block 608 is optional and in some embodiments there is no compensation for elevation and azimuth dependent antenna variations for the antennas associated with the respective reference receivers.

At block 610, the double differencing module 120 performs a modulo operation on the compensated double-differences. The modulo operation limits the phase to a range of minus one-half wavelength to plus one-half wavelength ($\pm\lambda/2$) by subtracting a whole number of wavelengths.

In one implementation of this embodiment, the modulo results are weighted by the carrier phase double difference noise 1σ, and the noise components for the various reference receiver pairs do not all have the same weight. Most noise errors in the radio frequency signals 450(1-N) can be predicted based on standard multipath and thermal noise models.

In one embodiment, the double differencing module 120 also filters the double-differences to reduce noise content. In another embodiment, the double differencing module is further configured to average the compensated double-differences over time. In yet another embodiment, the double differencing module is configured to average the compensated double-differences over time and to filter the double-differences to reduce noise content.

The double differencing module 120 is communicatively coupled to provide input to the gradient estimator module 130. The input provided to the gradient estimator module 130 is the averaged, compensated (including modulo operation) double differences. The averaged, compensated double differences are accepted at the gradient estimator module 130. In one implementation of this embodiment, a parity check is done before the averaged, compensated double differences are sent to the gradient estimator module 130. For example, a parity check is done before the averaged, compensated double differences are sent to the gradient estimator module 130 as described in the patent application entitled GROUND-BASED SYSTEM AND METHOD TO EXTEND THE DETECTION OF EXCESSIVE DELAY GRADIENTS USING PARITY CORRECTIONS filed as application Ser. No. 14/253,445 on the same day herewith.

At block 612, the gradient estimator module 130 estimates a magnitude of the horizontal delay gradient resulting from the gradient 22 in the ionosphere 20 between the monitored satellite 200-1 and the pairs 270-272 of reference receivers 251-254. The horizontal delay gradients are caused by anomalous ionospheric delay gradients along the line of sight to a satellite from a ground reference receiver. Horizontal delay gradients can also result from other anomalous signal conditions. In one implementation of this embodiment, the horizontal delay gradients are determined as described in U.S. Pat. No. 8,094,064 by Brenner entitled "Ground-based System and Method to Monitor for Excessive Delay Gradients", which is fully incorporated by reference herein.

At block 614, the gradient estimator module 130 determines if at least one of the estimated gradients $\hat{G}_n$ exceeds the selected gradient threshold T. The selected gradient threshold is stored in the memory 150 or the storage medium 170. The selected gradient threshold is set high enough so that it is not exceeded by noise only. The noise may be different in different directions and this is considered when setting the gradient threshold. When a gradient anomaly is present, the probability of a missed detection $p_{md}$ can be calculated by using a non-central $\chi^2$ distribution.

At block 616, the gradient estimator module 130 issues an alert if the estimated magnitude of the horizontal delay gradient exceeds the selected gradient threshold. The alert can be an alert signal and/or an exclusion command. In one embodiment, an exclusion command is sent from the horizontal delay gradient monitor 95 to the ground station broadcast 92. In another embodiment, an alert signal is sent from the horizontal delay gradient monitor 95 to the ground station broadcast 92. In another embodiment, an alert signal is also sent from the horizontal delay gradient monitor 95 to the ground station 90 and the ground station 90 is communicatively coupled to a display to alert an air traffic controller based on the issuing of the alert.

At block 618, the ground station 90 takes steps to cease the broadcast or to exclude the affected monitored satellites from providing navigation system data to an aircraft 40 via the communication link 41 if at least one of the monitored satellites has an estimated gradient that exceeded the gradient threshold. For example, the ground station broadcast 92 receives the exclusion command output from the gradient estimator module 130 and modifies the broadcast messages to the aircraft 40 in the region to stop the aircraft 40 from using the information from the monitored satellites which are experiencing the gradient anomaly. If necessary, the ground station 90 takes steps to cease the broadcast from the ground station broadcast 92 if at least one of the monitored satellites has an estimated gradient that exceeded the gradient threshold.

In one implementation of this embodiment, all the double differences are formed between the first reference receiver 251 and all other valid reference receivers 252-254 for all valid satellites 200(1-N) in view of the reference receivers 251-254. In another implementation of this embodiment, the double differences are formed between the first reference receiver 251 and all other valid reference receivers 252-254 for a subset 200(1-K) of the valid satellites 200(1-N), where K≤N. In another embodiment, all the satellites 200(1-N) that are transmitting to the reference receivers 251-254 are monitored satellites and a subset of the other satellites are used as described herein to determine the horizontal delay gradient in the satellite signals from each of the monitored satellites. In yet another embodiment, all the satellites 200(1-N) that are transmitting to the reference receivers 251-254 are monitored satellites and all of the other satellites are used as described herein to determine the horizontal delay gradient in the satellite signals from the each of the monitored satellites.

In one embodiment, a weighted combination of the squared x-component and squared y-component in the horizontal plane is formed and compared to a second threshold. If the gradient threshold is exceeded for one satellite (e.g., an $n^{th}$ satellite but no other satellite exceeds their second threshold, an anomaly has been detected in the $n^{th}$ satellite and the $n^{th}$ satellite is excluded from providing navigation data for an aircraft).

Embodiments of the systems and methods described herein can be used to reduce the threat to navigation systems in aircraft due to anomalous gradients in the electron density of the ionosphere.

Example Embodiments

Example 1 includes a processing module to monitor a horizontal delay gradient in satellite signals, the processing module comprising: a dual-processing-satellite-differencing module operable to: receive carrier phase measurements for at least two satellites from at least two reference receivers, the at least two satellites including a monitored satellite and at least one other satellite, wherein the at least two reference receivers have a known geometric relationship to each other, and implement a first processing mode to normalize first satellite differences between $+\lambda/2$ and $-\lambda/2$; implement a second processing mode configured to normalize second satellite differences between 0 and $\lambda$; and select for further processing one of: data indicative of the first satellite differences processed according to the first processing mode; and data indicative of the second satellite differences processed according to the second processing mode; a double differencing module configured to form double-differences between one or more pairs of the at least two reference receivers based on the selected data input from the dual-processing-satellite-differencing module; and a gradient estimator module configured to estimate a magnitude of the horizontal delay gradient based on averaged compensated double-differences for the monitored satellite.

Example 2 includes the processing module of Example 1, wherein the dual-processing-satellite-differencing module further comprises: a first-processing-satellite-differences module configured to average normalized first satellite differences; a first variance calculation module to compute a first variance of the normalized first satellite differences; a second-processing-satellite-differences module configured to average normalized second satellite differences; a second variance calculation module to compute a second variance of the normalized second satellite differences; and selection logic to select the output, for further processing, based on the first variance of the first satellite differences and the second variance of the second satellite differences.

Example 3 includes the processing module of any of Examples 1-2, wherein the first processing mode is further configured to: compute the differences in the carrier phase measurements between satellite signals from the monitored satellite and at least one of the at least one other satellite; compute an average of the first satellite differences normalized between $+\lambda/2$ and $-\lambda/2$ at the first-processing-satellite-differences module; and compute a first variance of the first satellite differences at a first variance calculation module in the dual-processing-satellite-differencing module, and wherein the second processing mode is further configured to: compute an average of the second satellite differences normalized between 0 and $\lambda$ at the second-processing-satellite-differences module; and compute a second variance of the second satellite differences at a second variance calculation module in the dual-processing-satellite-differencing module.

Example 4 includes the processing module of any of Examples 1-3, wherein the double differencing module is further configured to: compensate the double-differences between the one or more pairs for one or more known difference-in-position of the reference receivers in the respective one or more pairs; perform a modulo operation to limit the compensated double-differences to a range of minus one-half wavelength to plus one-half wavelength.

Example 5 includes the processing module of Example 4, wherein the double differencing module is further configured to filter the compensated double-differences to reduce noise content.

Example 6 includes the processing module of any of Examples 4-5, wherein the double differencing module is further configured to average the compensated double-differences over time.

Example 7 includes the processing module of any of Examples 4-6, wherein the double differencing module is further configured to compensate for elevation and azimuth dependent antenna variations for antennas respectively associated with the at least two reference receivers.

Example 8 includes the processing module of any of Examples 1-7, wherein the gradient estimator module is further configured to compare the estimated magnitude of the delay gradient to a selected gradient threshold.

Example 9 includes a method of monitoring for a delay gradient to a monitored satellite, the method comprising: receiving carrier phase measurements from at least two reference receivers at a dual-processing-satellite-differencing module of a processing module, wherein the at least two reference receivers substantially simultaneously receive radio frequency signals from the monitored satellite and at least one other satellite; implementing a first processing mode at a first-processing-satellite-differences module in the dual-processing-satellite-differencing module to normalize computed first satellite differences between $+\lambda/2$ and $-\lambda/2$; implementing a second processing mode at a second-processing-satellite-differences module in the dual-processing-satellite-differencing module to normalize computed second satellite differences between 0 and $\lambda$ at the second-processing-satellite-differences module; selecting for further processing one of: data indicative of the first satellite differences processed according to the first processing mode; and data indicative of the second satellite differences processed according to the second processing mode; forming double-differences between one or more pairs of the at least two reference receivers based on the selected data input from the dual-processing-satellite-differencing module at a double differencing module in the processing module; and estimating, at a gradient estimator module in the processing module, a magnitude of the horizontal delay gradient based on averaged compensated double-differences for the monitored satellite.

Example 10 includes the method of Example 9, wherein implementing the first processing mode further comprises: computing the differences in the carrier phase measurements between the radio frequency signals from the monitored satellite and at least one other satellite for the at least two reference receivers at the first-processing-satellite-differences module; averaging the first satellite differences normalized between $+\lambda/2$ and $-\lambda/2$; and computing a first variance of the normalized first satellite differences.

Example 11 includes the method of Example 10, wherein implementing the second processing mode further comprises: averaging the second satellite differences normalized between 0 and $\lambda$; computing the second variance of the normalized second satellite differences, wherein the selecting for further processing is based on the first variance and the second variance.

Example 12 includes the method of any of Examples 9-11, further comprising: performing a modulo operation on compensated double-differences to limit the compensated double-differences to a range of minus one-half wavelength to plus one-half wavelength.

Example 13 includes the method of any of Examples 9-12, further comprising: determining if the estimated magnitude of the horizontal delay gradient exceeds a selected gradient threshold.

Example 14 includes the method of Example 13, further comprising: issuing an alert if the estimated magnitude of the horizontal delay gradient exceeds the selected gradient threshold; and excluding satellites from providing navigation system data to an aircraft based on the issuing of the alert.

Example 15 includes the method of any of Examples 13-14, further comprising: excluding the monitored satellite from providing navigation system data to an aircraft if the estimated magnitude of the horizontal delay gradient exceeds the selected gradient threshold.

Example 16 includes a ground based system to monitor for a horizontal delay gradient to a monitored satellite, the system comprising: at least two reference receivers positioned in a known geometric relationship to each other, the at least two reference receivers configured to substantially simultaneously receive radio frequency signals from the monitored satellite and at least one other satellite; and a processing module communicatively coupled to the at least two reference receivers, the processing module including a dual-processing-satellite-differencing module operable to:

receive carrier phase measurements for at least two satellites from at least two reference receivers, the at least two satellites including a monitored satellite and at least one other satellite, wherein the at least two reference receivers have a known geometric relationship to each other, and implement a first processing mode to normalize first satellite differences between $+\lambda/2$ and $-\lambda/2$; implement a second processing mode configured to normalize second satellite differences between 0 and $\lambda$; and select for further processing one of: data indicative of the first satellite differences processed according to the first processing mode; and data indicative of the second satellite differences processed according to the second processing mode.

Example 17 includes a ground based system of Example 16, wherein the dual-processing-satellite-differencing module includes: a first-processing-satellite-differences module configured to average normalized first satellite differences; a first variance calculation module to compute a first variance of the normalized first satellite differences; a second-processing-satellite-differences module configured to average normalized second satellite differences; a second variance calculation module to compute a second variance of the normalized second satellite differences; and selection logic to select output for further processing, based on the first variance and the second variance.

Example 18 includes the ground based system of any of Examples 16-17, wherein the processing module further includes a double differencing module operable to: form double-differences between pairs of the at least two reference receivers; compensate the double-differences between the pairs for a known difference-in-position of the reference receivers in the pairs; perform a modulo operation to limit the compensated double-differences to a range of minus one-half wavelength to plus one-half wavelength.

Example 19 includes the ground based system of any of Examples 16-18, wherein the processing module further comprises: a gradient estimator module configured to estimate a magnitude of the horizontal delay gradient based on averaged compensated double-differences for the monitored satellite.

Example 20 includes the ground based system of Example 19, wherein the gradient estimator module is further operable to compare the estimated magnitude of the delay gradient to a selected gradient threshold.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A processing module to monitor a horizontal delay gradient in satellite signals, the processing module comprising:
a dual-processing-satellite-differencing module;
wherein the dual processing-satellite-differencing module is configured to:
receive carrier phase measurements for at least two satellites from at least two reference receivers, the at least two satellites including a monitored satellite and at least one other satellite, wherein the at least two reference receivers have a known geometric relationship to each other; and
implement a first processing mode to normalize first satellite differences between $+\lambda/2$ and $-\lambda/2$;
implement a second processing mode;
wherein the second processing mode is configured to normalize second satellite differences between 0 and $\lambda$; and
select for further processing one of: data indicative of the first satellite differences processed according to the first processing mode; and data indicative of the second satellite differences processed according to the second processing mode;
a double differencing module;
wherein the double differencing module is configured to form double-differences between one or more pairs of the at least two reference receivers based on the selected data input from the dual-processing-satellite-differencing module; and
a gradient estimator module;
wherein the gradient estimator module is configured to estimate a magnitude of the horizontal delay gradient based on averaged compensated double-differences for the monitored satellite.

2. The processing module of claim 1, wherein the dual-processing-satellite-differencing module further comprises:
a first-processing-satellite-differences module;
wherein the first-processing-satellite-difference module is configured to average normalized first satellite differences;
a first variance calculation module to compute a first variance of the normalized first satellite differences;
a second-processing-satellite-differences module;
wherein the second-processing-satellite-differences module is configured to average normalized second satellite differences;
a second variance calculation module to compute a second variance of the normalized second satellite differences; and
selection logic to select the output, for further processing, based on the first variance of the first satellite differences and the second variance of the second satellite differences.

3. The processing module of claim 1, wherein the first processing mode is further configured to:
compute the differences in the carrier phase measurements between satellite signals from the monitored satellite and at least one of the at least one other satellite;
compute an average of the first satellite differences normalized between $+\lambda/2$ and $-\lambda/2$ at the first-processing-satellite-differences module; and
compute a first variance of the first satellite differences at a first variance calculation module in the dual-processing-satellite-differencing module, and wherein the second processing mode is further configured to:
compute an average of the second satellite differences normalized between 0 and $\lambda$ at the second-processing-satellite-differences module; and
compute a second variance of the second satellite differences at a second variance calculation module in the dual-processing-satellite-differencing module.

4. The processing module of claim 1, wherein the double differencing module is further configured to:
compensate the double-differences between the one or more pairs for one or more known difference-in-position of the reference receivers in the respective one or more pairs;
perform a modulo operation to limit the compensated double-differences to a range of minus one-half wavelength to plus one-half wavelength.

5. The processing module of claim 4, wherein the double differencing module is further configured to filter the compensated double-differences to reduce noise content.

6. The processing module of claim 4, wherein the double differencing module is further configured to average the compensated double-differences over time.

7. The processing module of claim 4, wherein the double differencing module is further configured to compensate for elevation and azimuth dependent antenna variations for antennas respectively associated with the at least two reference receivers.

8. The processing module of claim 1, wherein the gradient estimator module is further configured to compare the estimated magnitude of the delay gradient to a selected gradient threshold.

9. A method of monitoring for a delay gradient in signals from a monitored satellite, the method comprising:
receiving carrier phase measurements from at least two reference receivers at a dual-processing-satellite-differencing module of a processing module, wherein the at least two reference receivers substantially simultaneously receive radio frequency signals from the monitored satellite and at least one other satellite;
implementing a first processing mode at a first-processing-satellite-differences module in the dual-processing-satellite-differencing module to normalize computed first satellite differences between $+\lambda/2$ and $-\lambda/2$;
implementing a second processing mode at a second-processing-satellite-differences module in the dual-processing-satellite-differencing module to normalize computed second satellite differences between 0 and $\lambda$ at the second-processing-satellite-differences module;
selecting for further processing one of: data indicative of the first satellite differences processed according to the first processing mode; and data indicative of the second satellite differences processed according to the second processing mode;
forming double-differences between one or more pairs of the at least two reference receivers based on the selected data input from the dual-processing-satellite-differencing module at a double differencing module in the processing module; and
estimating, at a gradient estimator module in the processing module, a magnitude of the horizontal delay gradient based on averaged compensated double-differences for the monitored satellite.

10. The method of claim 9, wherein implementing the first processing mode further comprises:
computing the differences in the carrier phase measurements between the radio frequency signals from the monitored satellite and at least one other satellite for the at least two reference receivers at the first-processing-satellite-differences module;
averaging the first satellite differences normalized between $+\lambda/2$ and $-\lambda/2$; and
computing a first variance of the normalized first satellite differences.

11. The method of claim 10, wherein implementing the second processing mode further comprises:
averaging the second satellite differences normalized between 0 and $\lambda$;
computing the second variance of the normalized second satellite differences, wherein the selecting for further processing is based on the first variance and the second variance.

12. The method of claim 9, further comprising:
performing a modulo operation on compensated double-differences to limit the compensated double-differences to a range of minus one-half wavelength to plus one-half wavelength.

13. The method of claim 9, further comprising:
determining if the estimated magnitude of the horizontal delay gradient exceeds a selected gradient threshold.

14. The method of claim 13, further comprising:
issuing an alert if the estimated magnitude of the horizontal delay gradient exceeds the selected gradient threshold; and
excluding satellites from providing navigation system data to an aircraft based on the issuing of the alert.

15. The method of claim 13, further comprising:
excluding the monitored satellite from providing navigation system data to an aircraft if the estimated magnitude of the horizontal delay gradient exceeds the selected gradient threshold.

16. A ground based system to monitor for a horizontal delay gradient to a monitored satellite, the system comprising:
at least two reference receivers positioned in a known geometric relationship to each other, the at least two reference receivers configured to substantially simultaneously receive radio frequency signals from the monitored satellite and at least one other satellite; and
a processing module communicatively coupled to the at least two reference receivers, the processing module including a dual-processing-satellite-differencing module;
wherein the dual-processing-satellite-differencing module is configured to:
receive carrier phase measurements for at least two satellites from at least two reference receivers, the at least two satellites including a monitored satellite and at least one other satellite, wherein the at least two reference receivers have a known geometric relationship to each other, and
implement a first processing mode to normalize first satellite differences between $+\lambda/2$ and $-\lambda/2$;
implement a second processing mode configured to normalize second satellite differences between 0 and $\lambda$; and
select for further processing one of: data indicative of the first satellite differences processed according to the first processing mode; and data indicative of the second satellite differences processed according to the second processing mode.

17. A ground based system of claim 16, wherein the dual-processing-satellite-differencing module includes:
a first-processing-satellite-differences module;
wherein the first-processing-satellite-differences module is configured to average normalized first satellite differences;
a first variance calculation module to compute a first variance of the normalized first satellite differences;
a second-processing-satellite-differences module configured to average normalized second satellite differences;
a second variance calculation module to compute a second variance of the normalized second satellite differences; and
selection logic to select output for further processing, based on the first variance and the second variance.

18. The ground based system of claim 16, wherein the processing module further includes a double differencing module;
wherein the double differencing module is configured to:
form double-differences between pairs of the at least two reference receivers;
compensate the double-differences between the pairs for a known difference-in-position of the reference receivers in the pairs;
perform a modulo operation to limit the compensated double-differences to a range of minus one-half wavelength to plus one-half wavelength.

19. The ground based system of claim 16, wherein the processing module further comprises:
a gradient estimator module;
wherein the gradient estimator module is configured to estimate a magnitude of the horizontal delay gradient based on averaged compensated double-differences for the monitored satellite.

20. The ground based system of claim 19, wherein the gradient estimator module is further configured to compare the estimated magnitude of the delay gradient to a selected gradient threshold.

\* \* \* \* \*